(12) United States Patent
Raupach et al.

(10) Patent No.: US 7,172,803 B2
(45) Date of Patent: Feb. 6, 2007

(54) LASER MARKABLE CARRIER UNIT

(75) Inventors: Roland Raupach, Reinheim (DE); Rolf Eymann, Reinheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/522,797

(22) PCT Filed: Jul. 25, 2003

(86) PCT No.: PCT/EP03/08224

§ 371 (c)(1),
(2), (4) Date: Jan. 31, 2005

(87) PCT Pub. No.: WO2004/012515

PCT Pub. Date: Feb. 12, 2004

(65) Prior Publication Data

US 2005/0249938 A1    Nov. 10, 2005

(30) Foreign Application Priority Data

Jul. 31, 2002    (DE) .................... 102 35 018

(51) Int. Cl.
B32B 7/06 (2006.01)
B32B 27/20 (2006.01)
B32B 27/32 (2006.01)
B32B 27/34 (2006.01)
B32B 27/36 (2006.01)

(52) U.S. Cl. ............. 428/198; 428/195; 428/40.1; 428/40.9; 428/42.1; 428/324; 428/325; 428/328; 428/336; 428/363; 428/412; 428/474.4; 428/480; 428/500; 283/81; 283/85; 283/86; 283/87; 283/100; 283/105; 283/101; 283/107; 430/1; 430/2; 430/275.1; 430/297

(58) Field of Classification Search .............. None
See application file for complete search history.

(56) References Cited

U.S. PATENT DOCUMENTS

| | | | | |
|---|---|---|---|---|
| 4,787,158 A * | 11/1988 | Vitol | ............. | 40/638 |
| 5,422,373 A * | 6/1995 | Franzmann | ............. | 514/598 |
| 5,422,383 A | 6/1995 | Takahashi | | |
| 5,770,283 A * | 6/1998 | Gosselin et al. | ............. | 428/35.7 |
| 5,831,661 A * | 11/1998 | Tabuchi et al. | ............. | 347/262 |
| 5,843,547 A * | 12/1998 | Kulper et al. | ............. | 428/40.1 |
| 5,985,078 A * | 11/1999 | Suess et al. | ............. | 156/239 |
| 6,066,437 A * | 5/2000 | Kosslinger | ............. | 430/297 |
| 6,214,917 B1 * | 4/2001 | Linzmeier et al. | ............. | 524/430 |
| 6,291,551 B1 * | 9/2001 | Kniess et al. | ............. | 523/216 |
| 6,521,688 B1 * | 2/2003 | Linzmeier et al. | ............. | 524/430 |
| 6,545,065 B2 * | 4/2003 | Solms et al. | ............. | 523/171 |
| 6,670,008 B1 * | 12/2003 | Ognissanti et al. | ............. | 428/40.1 |
| 6,727,308 B2 * | 4/2004 | Kniess et al. | ............. | 524/437 |
| 6,824,849 B2 * | 11/2004 | Herzog et al. | ............. | 428/40.1 |
| 7,021,549 B2 * | 4/2006 | O'Rell et al. | ............. | 235/488 |
| 2001/0030179 A1 * | 10/2001 | Knieb et al. | ............. | 219/121.69 |
| 2002/0122931 A1 * | 9/2002 | Brownfield et al. | ............. | 428/324 |

FOREIGN PATENT DOCUMENTS

| | | |
|---|---|---|
| DE | 19630478 | 1/1998 |
| DE | 19642040 | 1/1998 |
| DE | 19905415 | 8/2000 |
| EP | 0190997 | 8/1986 |
| EP | 0941663 | 9/1999 |
| JP | 03-270980 | * 12/1991 |
| JP | 10-138642 | * 5/1998 |
| WO | WO 03018700 | 3/2003 |

* cited by examiner

Primary Examiner—Vivian Chen
(74) Attorney, Agent, or Firm—Millen, White, Zelano & Branigan, P.C.

(57) ABSTRACT

The present invention relates to the laser inscription of a flexible inner support layer of a multilayered support unit, which is distinguished by the fact that the laser inscription of the inner support layer is carried out through one or more flexible outer laser-inactive support layers which are separate or can be separated from one another.

20 Claims, No Drawings

LASER MARKABLE CARRIER UNIT

The present invention relates to the laser inscription of a flexible inner support layer of a multilayered support unit, which is distinguished by the fact that the laser inscription of the inner support layer is carried out through one or more flexible outer laser-inactive support layers which are separate or can be separated from one another.

The non-contact, very fast and flexible marking of plastic packaging using lasers is increasing in importance. Thus, it is frequently necessary to apply sell-by dates, bar codes, company logos, serial numbers, etc., to plastics or plastic films. Thus, in DE 198 10 952, single- or multilayered food casings based on natural and/or synthetic polymers are rendered markable by laser beams through the addition of a laser-sensitive pigment.

However, the process described in DE 198 10 952 is not suitable for multilayered support units, such as, for example, double sacks. In packaging, plastic double sacks generally consist of two sacks placed one inside the other. The inscription of the inner sack is carried out by hand or using an automatic labeller, which applies a pre-printed label to the inner sack. After filling, the first sack is subsequently placed in the second sack. On use of this double sack by customers, the outer sack can be removed if soiled and the clean inner sack transferred into the production area for emptying. The prior labelling of the inner plastic sack serves for identification of the introduced product and the safety requirements in the case of introduced hazardous materials, even after the outer sack with the product label has been removed.

It is disadvantageous here that the manual labelling of the inner sack causes very high personnel costs and therefore is only economically acceptable in the case of very small production batches. Besides the double sacks described consisting of two prefabricated sacks placed manually one inside the other, there is on the market a double plastic sack which has a particular production and sealing technique which is such that, if the outer sack is removed after opening, a cleaner, but this time still sealed inner sack is available. The problem here is that, after removal of the outer sack, which usually also carries the product label, the inner sack has no inscription which enables the user to identify the contents.

Some requisite product data, such as, for example, batch number, article number, fill date, etc., are only known just before filling and are generally applied to the outer label or to the outside of the sack by means of a suitable labelling method.

In the case of a double sack, the inner and outer sacks can be closed and bonded to one another at certain points or continuously on the upper edge. This bonding enables easy opening for the filling operation and prevents contents entering between the two sack layers.

However, it is disadvantageous that this bonding prevents the inscription of the inner sack before and after filling. It has hitherto not been possible to achieve marking of the inner sack with the requisite data with adequate economy, either in an automated manner or manually.

The object of the present invention is therefore to find a marking method for multilayered flexible support units which enables the inner layer to be marked through the outer layers without marking or damaging the outer layers.

Surprisingly, it has now been found that high-contrast marking in the multilayered system takes place only on the inner layer on exposure to laser light if the inner layer in multilayered flexible plastic support units is doped with a laser-sensitive pigment and/or additive or a laser-markable layer is applied to the inner layer.

The invention therefore relates to laser-markable flexible plastic support units, characterised in that they consist of an inner flexible support layer and one or more flexible outer laser-inactive support layers which can be or are separated from one another, where the inner layer comprises one or more laser-sensitive pigments and/or additives.

On irradiation of the support unit, the laser light passes through the outer layer without leaving behind markings and/or damage and marks or inscribes the inner support layer. The process according to the invention enables the inner sack in the case of double sacks to be marked through the outer sack and the requisite information, such as, for example, product contents, batch number, etc., to be applied.

The use of a laser-absorbent pigment or additive in the inner plastic layer causes carbonisation or foaming to take place in the layer to be marked on absorption of the laser beam, resulting in a durable and high-contrast dark marking.

The laser light-absorbent substances which are suitable for the marking are preferably based on anthracene, pentaerythritol, copper phosphates, copper hydroxide phosphates, for example libethenite, molybdenum disulfide, antimony(III) oxide and bismuth oxychloride, flake-form, in particular transparent or semi-transparent, substrates made from, for example, phyllosilicates, such as, for example, synthetic or natural mica, talc, kaolin, glass flakes, $SiO_2$ flakes or synthetic support-free flakes. Also suitable are flake-form metal oxides, such as, for example, flake-form iron oxide, aluminium oxide, titanium dioxide, silicon dioxide, LCPs (liquid crystal polymers), holographic pigments, conductive pigments or coated graphite flakes.

Flake-form pigments which can be employed are also metal flakes, which may be uncoated or alternatively covered with one or more metal-oxide layers; preference is given, for example, to Al, Cr, Fe, Au, Ag and steel flakes. Should corrosion-susceptible metal flakes, such as, for example, Al, Fe or steel flakes, be employed in uncoated form, they are preferably covered with a protective polymer layer.

Particularly preferred substances are mica flakes which are uncoated or coated with one or more metal oxides. The metal oxides used here are both colourless high-refractive-index metal oxides, such as, in particular, titanium dioxide, antimony(III) oxide, zinc oxide, tin oxide and/or zirconium dioxide, and also coloured metal oxides, such as, for example, chromium oxide, nickel oxide, copper oxide, cobalt oxide and in particular iron oxide ($Fe_2O_3$, $Fe_3O_4$). The absorber material used is particularly preferably antimony(III) oxide, alone or in combination with tin oxide.

Pigments based on transparent or semi-transparent flake-form substrates are described, for example, in the German patents and patent applications 14 67 468, 19 59 998, 20 09 566, 22 14 454, 22 15 191, 22 44 298, 23 13 331, 25 22 572, 31 37 808, 31 37 809, 31 51 343, 31 51 354, 31 51 355, 32 11 602, 32 35 017, 38 42 330, 44 41 223, 196 18 569, 196 38 708, 197 07 806 and 198 03 550.

These substrates are known and in the majority of cases commercially available, for example under the trade name Iriodin® Laserflair from Merck KGaA, and/or can be produced by standard processes known to the person skilled in the art.

Coated $SiO_2$ flakes are disclosed, for example, in WO 93/08237 (wet-chemical coating) and DE-A 196 14 637 (CVD process).

Multilayered pigments based on phyllosilicates are disclosed, for example, in the DE-A 196 18 569, DE-A 196 38

708, DE-A 197 07 806 and DE-A 198 03 550. Particularly suitable are multilayered pigments having the following structure:

mica+$TiO_2$+$SiO_2$+$TiO_2$
mica+$TiO_2$+$SiO_2$+$TiO_2$/$Fe_2O_3$
mica+$TiO_2$+$SiO_2$+(Sn, Sb)$O_2$
mica+$SiO_2$+(Sn, Sb)$_2$O
mica+(Sn, Sb)$_2$O
$SiO_2$ flake+$TiO_2$+$SiO_2$+$TiO_2$
$SiO_2$ flake+$TiO_2$+$SiO_2$+(Sn, Sb)$O_2$
glass flake+$TiO_2$+$SiO_2$+(Sn, Sb)$O_2$ Particularly preferred laser light-absorbent substances are natural or synthetic mica, $TiO_2$-coated mica flakes, conductive pigments, such as, for example, (Sn,Sb)$O_2$-coated flake-form substrates, antimony and antimony(III) oxide, anthracene, pentaerythritol, copper hydroxide phosphates, molybdenum disulfide, undoped or tin oxide-doped antimony(III) oxide and bismuth oxychloride, as well as mixtures of the said substances.

The addition of the laser-sensitive pigments and/or additives in concentrations of from 0.05 to 10% by weight, preferably from 0.05 to 6% by weight and in particular from 0.1 to 3% by weight, based on the inner support layer or based on the laser-doped layer on the surface of the inner support layer (for example the label) results in high contrast and high edge sharpness being achieved during laser marking.

If a mixture of a plurality of different laser-sensitive pigments and/or additives is employed, the total concentration should not exceed 10% by weight.

The concentration of the laser-sensitive pigment and/or additive is dependent on the plastic system employed. The small proportion of pigment or additive does not modify the plastic system, or only does so to an insignificant extent, and furthermore also does not influence its processing properties.

The inner and outer layers of the support unit can consist of different plastics or of the same plastics. Suitable plastics are, in particular, thermosets and thermoplastics.

The inner and outer layers of the laser-markable support units can consist of the known thermoplastics and thermosets, as described, for example, in Ullmann, Vol. 15, pp. 457 ff., Verlag VCH. Particularly suitable are polyethylene, polypropylene, polyamides, polyesters, polyester-esters, polyether-esters, polyphenylene ethers, polyacetals, polybutylene terephthalate, polymethyl methacrylate, polyvinyl acetal, polystyrene, acrylonitrile-butadiene-styrene (ABS), acrylonitrile-styrene-acrylate (ASA), vinyl acetate, polycarbonate, polyether sulfones and polyether ketones, as well as copolymers and/or mixtures thereof.

The inner support layers of the support unit preferably consist of polyethylene or polypropylene and optionally copolymers with, for example, vinyl acetate.

The inner and/or outer layers may be transparent or coloured with colorants in all or optionally only in one of the layers. The colorants allow colour variations of all types and do not influence the marking result. Suitable colorants are, in particular, coloured metal-oxide pigments, such as, for example, $TiO_2$, and organic pigments and dyes. The colorants are usually employed in amounts of from 0 to 6% by weight, based on the support layer.

Marking of the inner support layer becomes possible through incorporation of the laser-sensitive pigments and/or additives into the plastic or application of a markable coating to the surface of the inside layer. This markable layer comprising laser-sensitive pigments and/or additives is applied to the inner layer by conventional techniques, such as, for example, by means of coextrusion, lacquering, coating or printing. The laser-markable layer is preferably applied to the inner film by coextrusion of a coextrusion composition filled with the laser-markable pigment. It is furthermore possible for a label comprising laser-sensitive pigments to be stuck onto the inner film.

The support units are packaging or food casings or films having at least two, furthermore three or four, support layers. The support layers are preferably films and multilayered films.

The films can be monolithic or multilayered extrusion films, produced, for example, by the film-blowing or chill-roll process. The support layers, such as, for example, sacks and films, may additionally be provided with adhesive layers and/or lacquer layers.

The process according to the invention is particularly suitable for the marking of inner sacks in double sacks, two or more films lying one on top of the other, where the individual layers are not bonded to one another over the entire area.

The marking of the flexible support unit is easy to carry out. The marking is carried out in the plastic matrix by mixing the laser-sensitive pigment and/or additive with the plastic granules and shaping under the action of heat. During incorporation of the laser-sensitive substance, adhesives, organic polymer-compatible solvents, stabilisers and/or surfactants which are heat-stable under the working conditions can be added to the plastic granules. The plastic granules doped in this way are generally produced by introducing the plastic granules into a suitable mixer, wetting them with conventional additives and then adding and mixing in the laser-sensitive substance. The plastic is generally coloured via a colour concentrate (master-batch) or compound. The mixture obtained in this way can then be processed directly in an extruder or an injection-moulding machine. In this way, the laser-sensitive pigment is homogeneously distributed in the plastic.

On application of the laser-sensitive layer to the surface of the inner support layer, the laser-sensitive substance can be applied and/or introduced directly to and/or into the plastic to be inscribed. The absorber component is applied to the surface of the system to be marked by conventional techniques, such as coextrusion, lacquering, brushing, printing, spraying, knife coating, adhesive bonding. The layer thickness is generally from 0.1 to 10.000 nm, preferably from 10 to 5000 nm, in particular from 50 to 3000 nm.

It is furthermore also possible for a plastic film doped with a laser-sensitive pigment to be bonded to the inner support layer. This process is employed, in particular, in the laser inscription of labels.

The laser inscription is carried out by introducing the test specimen into the ray path of a pulsed laser, preferably a $CO_2$ or Nd:YAG laser. Inscription with an excimer laser, for example via a mask technique, is furthermore possible. However, the desired results can also be achieved with other conventional types of laser which have a wavelength in a region of high absorption of the laser light-absorbent substance used. The marking obtained is determined by the irradiation time (or pulse number in the case of pulsed lasers) and irradiation power of the laser and of the plastic system or lacquer system used. The power of the laser used depends on the particular application and can readily be determined in each individual case by the person skilled in the art.

The laser used generally has a wavelength in the range from 157 nm to 10.6 µm, preferably in the range from 532 nm to 10.6 µm. Examples which may be mentioned here are $CO_2$ lasers (10.6 μm) and Nd:YAG lasers (1064 or 532 nm) or pulsed UV lasers. The excimer lasers have the following wavelengths: $F_2$ excimer laser (157 nm), ArF excimer laser (193 nm), KrCl excimer laser (222 nm), KrF excimer laser (248 nm), XeCl excimer laser (308 nm), XeF excimer laser (351 nm), frequency-multiplied Nd:YAG lasers having wavelengths of 355 nm (frequency-tripled) or 265 nm (frequency-quadrupled). Particular preference is given to the use of Nd:YAG lasers (1064 or 532 nm) and $CO_2$ lasers. The energy densities of the lasers employed are generally in the range from 0.3 $mJ/cm^2$ to 50 $J/cm^2$, preferably from 0.3 $mJ/cm^2$ to 10 $J/cm^2$.

On use of pulsed lasers, the pulse frequency is generally in the range from 1 to 30 kHz. Corresponding lasers which can be employed in the process according to the invention are commercially available.

The flexible laser-markable support unit can be used in all areas where conventional printing processes or labels have hitherto been employed for the inscription of packing materials, for example for packaging in the foods sector, in the case of pharmaceutical products or in the toys sector. The markings on the packaging are distinguished by the fact that they are wipe- and scratch-resistant, stable during subsequent sterilisation processes and can be applied in a hygienically clean manner during the marking process.

The following examples are intended to explain the invention, but without restricting it. The percentages indicated are percent by weight.

EXAMPLES

Example 1

An inner multilayered film of polyethylene, layer thickness 80 μm, is coextruded. 2.0% by weight of Iriodin® LS 825 (laser-sensitive conductive pigment from Merck KGaA) are introduced into the outer white layer of the inner film, while the inner layer of the inner film, which is in contact with the product, comprises no pigments or colour components.

The laser-sensitive pigment is added via a masterbatch in order to achieve homogeneous distribution. The outer film consists of polyethylene, layer thickness 140 μm. The film is transparent and is manufactured without laser-sensitive pigment.

The two films are converted into sacks, where the inner sack has the laser-pigmented outer layer, while the outer sack is transparent and is bonded to the inner sack on the upper edge. This bonding prevents labelling of the inner sack just before filling since there is no access to the inner sack. However, it is possible to carry out an infinitely variable and durable inscription on the outer pigmented support layer of the inner film just before filling of the sack using an Nd:YAG laser at a wavelength of 1064 nm. The inscription achieved is of high contrast and readily legible.

Example 2

A polyethylene label, layer thickness 90 μm, is provided with 3% by weight of Iriodin® LS 825. This label is stuck to the inner sack during production of the double sack. The inner sack is subsequently introduced into the outer sack, and the upper edges of the two sacks are bonded to one another. The laser pigment is added to the label via a masterbatch in order to achieve homogeneous distribution.

The label can optionally be printed in a variety of colours before application, for example with an orange field in order to comply with hazardous materials regulations if needed. The colour on the surface of the label must not absorb the laser beam in this case.

An infinitely variable and durable inscription is carried out on the label applied to the inside through the outer film just before filling of the sack using a Nd:YAG laser at a wavelength of 1064 nm. The inscription achieved is of high contrast and readily legible.

The invention claimed is:

1. A laser-markable flexible support unit comprising an inner flexible support layer and one or more flexible outer laser-inactive support layers which can be or are separated from one another, where the inner flexible support layer comprises one or more laser-sensitive pigments or additives.

2. A laser-markable flexible support unit according to claim 1, wherein said one or more laser sensitive pigments or additives is selected from, anthracene, pentaerythritol, copper phosphates, copper hydroxide phosphates, molybdenum disulfide, antimony(III) oxide, bismuth oxychloride, phyllosilicates, glass flakes, $SiO_2$ flakes, metal-oxide flakes, conductive pigments, holographic pigments, pearlescent pigments, antimony-doped tin oxide, coated graphite flakes, and mixtures thereof.

3. A laser-markable flexible support unit according to claim 2, wherein said inner flexible support layer contains a phyllosilicate selected from natural and synthetic mica, kaolin and talc.

4. A laser-markable flexible support unit according to claim 3, wherein the laser-sensitive pigments or additives are an $(Sn,Sb)O_2$-coated flake-form substrate.

5. A laser-markable flexible support unit according to claim 2, wherein said inner flexible support layer contains a pearlescent pigment based on mica flakes, $SiO_2$ flakes, $Al_2O_3$ flakes, $Fe_2O_3$ flakes or glass flakes.

6. A laser-markable flexible support unit according to claim 2, wherein said inner flexible support layer contains a pearlescent pigment which is a $TiO_2$-coated mica pigment.

7. A laser-markable flexible support unit according to claim 1, wherein the proportion of laser-sensitive pigment or additive in the inner support layer is 0.05 to 10% by weight, based on the support layer when the support layer is doped with the laser-sensitive pigment or additive, or based on a laser-doped surface layer of the support layer when the laser-sensitive pigment or additive is applied to the surface of the support layer.

8. A laser-markable flexible support unit according to claim 7, wherein the laser-sensitive pigment or additive is applied to the surface of the support layer at a thickness of 0.1 to 10,000 nm.

9. A laser-markable flexible support unit according to claim 7, wherein the laser-sensitive pigment or additive is applied to the surface of the support layer at a thickness of 50 to 3,000 nm.

10. A laser-markable flexible support unit according to claim 1, wherein the support unit comprises plastic.

11. A laser-markable flexible support unit according to claim 10, wherein the plastic is a thermoplastic or a thermoset.

12. A laser-markable flexible support unit according to claim 10, wherein the plastic is selected from polyethylene, polypropylene, polyamide, polyester, polyester-ester, polyether-ester, poly-phenylene ether, polyacetal, polybutylene terephthalate, polymethyl methacrylate, polyvinyl acetal, polystyrene, acrylonitrile-butadiene-styrene (ABS), acrylonitrile-styrene-acrylate (ASA), vinyl acetate, polycarbonate, polyether sulfones, polyether ketones, and mixtures thereof.

13. A process for inscripting or marking a flexible support unit according to claim 1, comprising incorporating into the inner support layer or applying to its surface a laser-sensitive pigment and/or additive, and carrying out laser inscription of the inner support layer through the one or more flexible outer laser-inactive support layers, whereby only the inner layer is marked.

14. A process according to claim 13, wherein $CO_2$ or Nd:YAG laser is used.

15. A laser-markable flexible plastic support unit inscribed and marked by the process of claim 13.

16. A laser-markable flexible support unit according to claim 15 that is or is part of a double sack or multilayered film structure which are not bonded to one another over the entire area.

17. A laser-markable flexible support unit according to claim 1 that is or is part of a double sack.

18. A laser-markable flexible support unit according to claim 1, wherein the laser-sensitive pigment and/or additive is mica flakes which are uncoated or coated with one or more metal oxides selected from titanium dioxide, antimony(III) oxide, zinc oxide, tin oxide and/or zirconium dioxide, chromium oxide, nickel oxide, copper oxide, cobalt oxide, iron oxide, $Fe_2O_3$, and $Fe_3O_4$.

19. A laser-markable flexible support unit according to claim 1, wherein the laser-sensitive pigment and/or additive is mica flakes which are coated with antimony(III) oxide, alone or in combination with tin oxide.

20. A laser-markable flexible support unit according to claim 1 that is or is part of a double sack, wherein the individual layers of the double sack are not bonded to one another over the entire area.

\* \* \* \* \*